May 7, 1963 R. E. STILWELL 3,088,350
DRIVE MEANS FOR A PORTABLE IRRIGATION SYSTEM
Original Filed Nov. 22, 1954
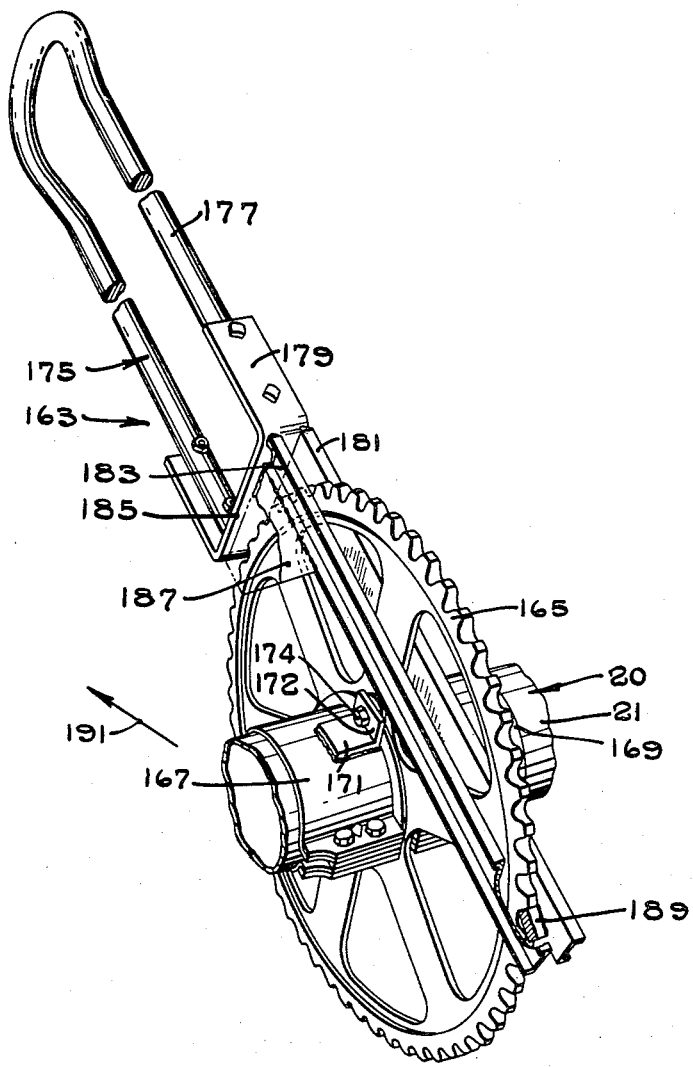
INVENTOR
ROBERT E. STILWELL
BY *Hans G. Hoffmeister*
ATTORNEY

United States Patent Office 3,088,350
Patented May 7, 1963

3,088,350
DRIVE MEANS FOR A PORTABLE IRRIGATION SYSTEM
Robert E. Stilwell, Santa Clara, Calif., assignor to FMC Corporation, a corporation of Delaware
Original application Nov. 22, 1954, Ser. No. 470,944, now Patent No. 2,892,466, dated June 30, 1959. Divided and this application May 11, 1959, Ser. No. 812,162
1 Claim. (Cl. 81—90)

The present invention relates to wheeled, portable irrigation systems, and more particularly concerns an improved drive means for moving a portable irrigation system from one location to another.

One object of the present invention is to provide an improved wheeled, portable irrigation system.

Another object is to provide a new manually operable drive for a wheeled irrigation pipe line.

These and other objects and advantages of the present invention will become apparent from the following description and accompanying drawing which is a fragmentary perspective of the drive means of the present invention.

The present application is a division of application Ser. No. 470,494 filed November 22, 1954, now Patent Number 2,892,466, dated June 30, 1959.

The portable irrigation system with which the drive means of the present invention is incorporaetd comprises a portable irrigation pipe line 20 including a plurality of light weight pipes 21 positioned in longitudinal alignment and connected by pipe couplings (not shown) having irrigation sprinklers (not shown) attached thereto. The couplings are so constructed and arranged that substantially no relative rotation or longitudinal movement between the pipes and the couplings can take place, thereby obtaining a substantially rigid pipe line. The pipe line 20 may be of any desired length, a common length of line being an eighth to a quarter of a mile so that the line may extend entirely across a field to be irrigated. To enable such a long pipe line to be easily moved, the line 20 is supported above the ground by a plurality of spoked wheels (not shown). The wheels are arranged at suitable intervals along the pipe line 20 and are rigidly fixed to its pipes 21 so that when the pipe line is rotated about its longitudinal axis the wheels will roll over the ground to move the pipe line laterally from one irrigating location to another.

The improved pipe line drive means of the present invention is indicated by reference numeral 163. Said drive is manually operable and comprises a gear 165 rigidly mounted on the pipe line 20 by means of collars 167 and 169 rigidly clamped to the pipe line. Said collars are provided with angles 171 having upstanding ears 172 (only one of which is shown) that mount a bolt 174 which passes through an aperture (not shown) in the gear 165. To rotate the gear 165 in either direction and to thus bring about the rotation of the pipe line 20 in either direction a removable lever 175 is provided. Said lever comprises a relatively long arm 177 attached to a U-shaped strap 179. A pair of parallel channels 181 and 183 extend longitudinally from one end of the bight 185 of the U-shaped strap 179, and gusset plates 187 (only one of which is shown) are welded between the strap 179 and the channels 181 and 183 to brace said channels. A tooth 189 of rectangular cross section is welded between the channels 181 and 183 adjacent their outer end, said tooth being so constructed and arranged as to fit between two adjacent teeth on the gear 165 with the channels 181 and 183 straddling the gear 165. The distance from the tooth 189 to the bight 185 of the U-shaped strap 179 is smaller than the diameter of the gear 165. Therefore, with the lever tooth 189 and channels 181 and 183 positioned with respect to the gear 165 as above described, the bight 185 will abut against the periphery or outer diametral surface of the teeth of the gear 165 on the opposite side of the gear from that where the lever tooth 189 engages the gear.

To rotate the pipe line 20 the lever 175 is positioned on the gear 165 as above described and in an upwardly extending position, as shown. The lever 175 is then manually pulled down, thus applying a torque to the gear 165 and rolling the pipe line 20 a short distance in the direction of the arrow 191. When the lever 175 nears the ground, it can be easily lifted from the gear 165 and again placed in an upwardly extending position in which it can again be manually depressed in order to roll the pipe 20 another short distance. In this manner, repeated small rotations of the gear 165 by the lever 175 will advance the pipe line 20 to its next irrigating position.

While I have described a preferred embodiment of the present invention, it will be understood that various changes and modifications may be made in the details thereof without departing from the spirit and scope of the appended claim.

Having thus described the invention, what I claim as new and desire to protect by Letters Patent is:

A manually actuated drive lever for rotating a gear fixed to a rotatable member comprising a pair of straight spaced elongate side members defining an elongate opening whose length is less than the diameter of the gear, said opening being arranged to receive an arc of the gear with the forward ends of said side members being disposed adjacent teeth at one end of the arc and the rear ends of said members being disposed adjacent teeth in the opposite end of the arc, a handle secured to and projecting rearwardly from the rear ends of said members, a fixed tooth rigidly mounted between said side members at their forward distal ends and having a rearwardly facing surface arranged to engage the forward face of an adjacent tooth to apply torque to said gear when said handle is pressed downwardly, said tooth having an inclined lower surface arranged to engage and slide over the teeth of said gear when said handle is moved in reverse direction to disengage said tooth after a torque-applying operation, a U-shaped abutment member connected between said side members and said handle and having a flat base upon an end portion of which said side members are rigidly mounted at a right angle thereto, said base being movable into abutting contact with the peripheral points of said gear teeth when said handle is swung downwardly to tighten the engagement between said fixed tooth and a tooth on said gear and to apply torque to said gear, and spaced flat gusset plate means mounted at the right angles formed by the juncture of the base of said abutment and said side members to enhance the combined rigidity of said side members and abutment means, whereby the inner facing surfaces of said gusset plate means additionally cooperate with said side members in automatically guiding said lever over said gear as said tooth is disengaged during reverse movement of said handle.

(References on following page)

References Cited in the file of this patent

UNITED STATES PATENTS

| | | |
|---|---|---|
| 206,352 | Noyes | July 23, 1878 |
| 455,606 | Byrne | July 7, 1891 |
| 740,878 | Lewis | Oct. 6, 1903 |
| 1,838,963 | Slattery | Dec. 29, 1931 |
| 2,601,064 | Snyder | June 17, 1952 |
| 2,612,067 | Brugmann | Sept. 30, 1952 |
| 2,665,941 | Idler | Jan. 12, 1954 |

FOREIGN PATENTS

| | | |
|---|---|---|
| 174,925 | Canada | Feb. 6, 1917 |
| 52,676 | France | June 12, 1945 |

OTHER REFERENCES

Popular Mechanics, May 1947. "Flywheel Tools," page 95.